(12) United States Patent
Hong et al.

(10) Patent No.: US 9,146,643 B2
(45) Date of Patent: Sep. 29, 2015

(54) TOUCH SENSING APPARATUS AND METHOD THEREOF

(75) Inventors: Gyung Hee Hong, Seoul (KR); Tah Joon Park, Gyunggi-do (KR); Sang Ho Lee, Gyunggi-do (KR); Yong Il Kwon, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 622 days.

(21) Appl. No.: 13/359,620

(22) Filed: Jan. 27, 2012

(65) Prior Publication Data

US 2013/0127774 A1 May 23, 2013

(30) Foreign Application Priority Data

Nov. 21, 2011 (KR) .......................... 10-2011-0121828

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ... G06F 3/044; G06F 3/0416; G06F 3/03547; G06F 3/041; G06F 3/0412; G06F 3/0418; G06F 2203/0339; G06F 2203/04103; G06F 3/047; G06F 3/04883; G06F 19/3418; G06F 1/169; G06F 1/1692; G06F 1/3203

USPC .................................. 345/156–158, 173–175
See application file for complete search history.

(56) References Cited

U.S. PATENT DOCUMENTS

| | | | |
|---|---|---|---|
| 8,542,202 B2 * | 9/2013 | Zhuang et al. | ................. 345/173 |
| 2011/0084929 A1 * | 4/2011 | Chang et al. | .................. 345/173 |
| 2011/0102353 A1 | 5/2011 | Kim et al. | |
| 2011/0175847 A1 | 7/2011 | Wang et al. | |

FOREIGN PATENT DOCUMENTS

| | | |
|---|---|---|
| KR | 10-0957836 | 5/2010 |
| KR | 10-2011-0200565 | 9/2011 |

* cited by examiner

*Primary Examiner* — Kevin Nguyen
*Assistant Examiner* — Kenneth B Lee, Jr.
(74) *Attorney, Agent, or Firm* — NSIP Law

(57) ABSTRACT

There are provided a touch sensing apparatus and a touch sensing method. The touch sensing apparatus includes: a panel unit provided with a plurality of electrodes; a sensing circuit unit detecting variations in capacitance in the plurality of electrodes; and a calculating unit determining a touch from the variations in capacitance, wherein the calculating unit applies different parameters for determining the touch to the plurality of individual electrodes. The parameters such as an integration time, a digital signal conversion time, and a driving signal application time are set differently according to positions in which the variations in capacitance are detected, driving efficiency may be improved and power consumption may be significantly reduced.

12 Claims, 9 Drawing Sheets

TOUCH SENSING APPARATUS AND METHOD THEREOF

CROSS-REFERENCE TO RELATED APPLICATIONS

This application claims the priority of Korean Patent Application No. 10-2011-0121828 filed on Nov. 21, 2011, in the Korean Intellectual Property Office, the disclosure of which is incorporated herein by reference.

BACKGROUND OF THE INVENTION

1. Field of the Invention

The present invention relates to a touch sensing apparatus and a method thereof that can accurately determine a touch by setting different parameters for measuring variations in capacitance and determining the touch depending on a sensing electrode or a sensing channel.

2. Description of the Related Art

Touch sensing apparatuses such as a touch screen, a touch pad, and the like, as user interface apparatuses attached to a display apparatus to provide an intuitive input method to a user, have been widely applied to a variety of electronic apparatuses such as a cellular phone, a personal digital assistant (PDA), a navigation device and the like, in recent years. In particular, recently, with the increase in demand for smart phones, the rate at which a touch screen has been adopted as a touch sensing apparatus capable of providing various input methods in a limited form factor has increased on a daily basis.

Touch screens adopted in portable electronic apparatuses may be largely classified into resistive type and capacitive type touch screens, according to a touch sensing method. Since the capacitive type touch screen is advantageous in that a life-span thereof may be relatively extended, and various input methods and gestures can be easily implemented therein, the adoption rate of the capacitive type touch screen has steadily increased. In particular, it is easier to implement a multi-touch interface in the capacitive type touch screen than in the resistive type touch screen, and as a result, the capacitive type touch screen is widely applied to an electronic apparatus such as a smart phone, or the like.

The capacitive type touch screen includes a plurality of electrodes connected to a plurality of sensing channels and senses a touch from a variation in capacitance, generated by the touch, in each electrode. Accordingly, the distance between the position of an electrode, in which the variation in capacitance is to be detected, and the position of the sensing channel, influences a response speed in detecting the variation in capacitance. When the variation in capacitance is detected in an area relatively distant from the sensing channel, overall performance may be deteriorated due to a low response speed.

SUMMARY OF THE INVENTION

An aspect of the present invention provides a touch sensing apparatus and a method thereof, in which a reference value, used to convert an analog signal generated from a variation in capacitance into a digital signal, is differently set depending on the position of a sensing channel or an electrode in which a variation in capacitance is detected. Accordingly, a touch may be accurately judged, regardless of the position of the touch on a panel on which a plurality of electrodes are provided, while a response speed is improved and power consumption is reduced to thereby improve overall performance.

According to an aspect of the present invention, there is provided a touch sensing apparatus including: a panel unit provided with a plurality of electrodes; a sensing circuit unit detecting variations in capacitance in the plurality of electrodes; and a calculating unit determining a touch from the variations in capacitance, wherein the calculating unit applies different parameters for determining the touch to the plurality of individual electrodes.

The panel unit may include a plurality of first electrodes extending in a first axial direction, and a plurality of second electrodes extending in a second axial direction intersecting the first electrodes extending in the first axial direction.

The touch sensing apparatus may further include a driving circuit unit applying a predetermined driving signal to the plurality of first electrodes, wherein the sensing circuit unit may detect the variations in capacitance in the second electrodes intersecting the first electrodes to which the driving signal is applied.

The calculating unit may set the different parameters, according to positions of the first electrodes to which the driving signal is applied and positions of the second electrodes in which the variations in capacitance are detected.

The parameters may include times during which the driving circuit unit applies the driving signal to the plurality of individual first electrodes.

The parameters may include at least one of a first time required for the sensing circuit unit to generate a voltage signal from the variations in capacitance and a second time required for the voltage signal to reach a predetermined level.

According to another aspect of the present invention, there is provided a touch sensing method, including: applying a driving signal to a plurality of individual first electrodes; detecting variations in capacitance in a plurality of second electrodes intersecting the plurality of first electrodes to which the driving signal is applied; and determining a touch from the variations in capacitance, wherein the determining of the touch includes setting different parameters for detecting the variations in capacitance, according to positions of the first electrodes to which the driving signal is applied and positions of the second electrodes in which the variations in capacitance are detected.

The detecting of the variations in capacitance may include detecting variations in mutual-capacitance generated between the first electrodes to which the driving signal is applied and the second electrodes.

The determining of the touch may include setting the different parameters according to at least one of the positions of the first electrodes to which the driving signal is applied and the positions of the second electrodes in which the variations in capacitance are detected.

The parameters may include a first time required for generating a voltage signal from the variations in capacitance, a second time required for the voltage signal to reach a predetermined level, and a third time during which the driving signal is applied to the first electrodes.

The determining of the touch may include: generating a digital signal from an analog signal depending on the variations in capacitance; and determining the touch from the digital signals.

The generating of the digital signal may include generating the digital signal by measuring times required for the analog signal to reach a predetermined level.

The generating of the digital signal may include setting the predetermined level differently, according to the positions of the first electrodes to which the driving signal is applied and the positions of the second electrodes in which the variations in capacitance are detected.

The generating of the digital signals may include generating the digital signal by measuring variations in a level of the analog signal for a predetermined time.

The generating of the digital signals may include setting the predetermined time differently, according to the positions of the first electrodes to which the driving signal is applied and the positions of the second electrodes in which the variations in capacitance are detected.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
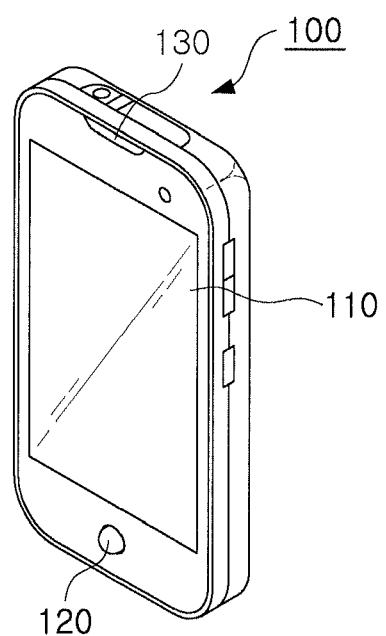
FIG. 1 is a perspective view illustrating an exterior of an electronic apparatus having a touch sensing apparatus according to an embodiment of the present invention.

Embodiments of the present invention will be described in detail with reference to the accompanying drawings. These embodiments will be described in detail in order to allow those skilled in the art to practice the present invention. It should be appreciated that various embodiments of the present invention are different but are not necessarily exclusive. For example, specific shapes, configurations, and characteristics described in an embodiment of the present invention may be implemented in another embodiment without departing from the spirit and scope of the present invention. In addition, it should be understood that positions and arrangements of individual components in each embodiment may be changed without departing from the spirit and scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawing.

Hereinafter, embodiments of the present invention will be described in detail with reference to the accompanying drawings so that those skilled in the art may easily practice the present invention.

FIG. 1 is a view showing an electronic apparatus to which a touch sensing apparatus according to an embodiment of the present invention is applicable. Referring to FIG. 1, an electronic apparatus 100 according to the present embodiment includes a display apparatus 110 for outputting an image, an input unit 120, an audio unit 130 for outputting audio, and a touch sensing apparatus integrated with the display apparatus 110.

As shown in FIG. 1, in the case of a mobile apparatus, the touch sensing apparatus is generally provided integrally with the display apparatus and needs to have high light transmittance enough to transmit the image displayed by the display apparatus. Therefore, the touch sensing apparatus may be implemented by forming a sensing electrode using a transparent and electrically conductive material such as indium-tin oxide (ITO), indium zinc oxide (IZO), zinc oxide (ZnO), carbon nano tube (CNT), or graphene, on a base substrate formed of a transparent film material such as polyethylene terephthalate (PET), polycarbonate (PC), polyethersulfone (PES), polyimide (PI), or the like. The display apparatus may include a wiring pattern disposed in a bezel area thereof, and the wiring pattern is connected to the sensing electrode formed of the transparent conductive material. Since the wiring pattern is visually shielded by the bezel area, the wiring pattern may be formed of a metallic material such as silver (Ag), copper (Cu), or the like.

In the case in which the touch sensing apparatus according to the embodiment of the present invention may not be provided integrally with the display apparatus like in a touch pad of a notebook computer, the touch sensing apparatus may be manufactured by simply patterning the sensing electrode on a circuit substrate with metal. However, for convenience of explanation, the touch sensing apparatus and method according to the embodiment of the present invention will be described based on the touch screen.

Figure 2:
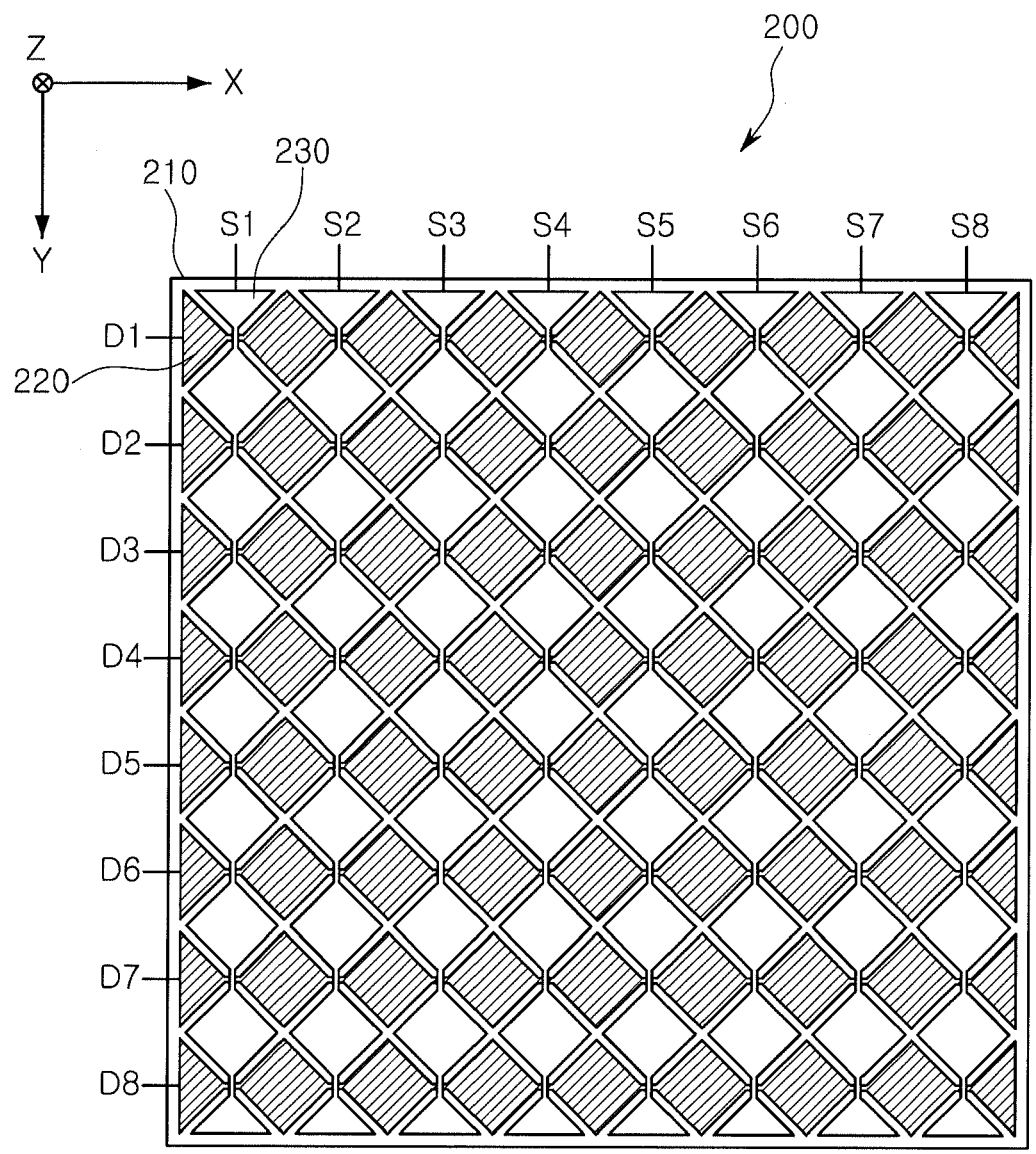
FIG. 2 is a plan view illustrating a touch sensing panel electrically connected to a touch sensing apparatus according to an embodiment of the present invention.

FIG. 2 is a plan view showing a touch sensing panel electrically connected to a touch sensing apparatus according to an embodiment of the present invention.

Referring to FIG. 2, a touch sensing panel 200 according to this embodiment includes a substrate 210 and a plurality of sensing electrodes 220 and 230 provided on the substrate 210. Although not shown in FIG. 2, each of the plurality of sensing electrodes 220 and 230 may be electrically connected to the wiring pattern of the circuit board attached to one end of the substrate 210 through a wire and a bonding pad. A controller integrated circuit is mounted on the circuit board to detect sensed signals generated from the plurality of sensing electrodes 220 and 230 and determine the touch based thereon.

In the touch screen apparatus, the substrate 210 may be a transparent substrate in which the sensing electrodes 220 and 230 may be formed, and may be formed of a plastic material such as polyimide (PI), polymethylmethacrylate (PMMA), polyethyleneterephthalate (PET), or polycarbonate (PC) or tempered glass. Further, apart from an area in which the sensing electrodes 220 and 230 are formed, a predetermined printing area for the wire connected to the sensing electrodes 220 and 230 may be formed on the substrate 210 in order to visually shield the wire formed of an opaque metallic material.

The plurality of sensing electrodes 220 and 230 may be provided on one surface or both surfaces of the substrate 210. In the case of the touch screen apparatus, the plurality of sensing electrodes 220 and 230 may be formed of a transparent conductive material such as indium-tin oxide (ITO), indium zinc-oxide (IZO), zinc oxide (ZnO), carbon nano tube (CNT), or grapheme based material. Although the sensing electrodes 220 and 230 having a rhombus or diamond-shaped pattern are shown in FIG. 2, the sensing electrodes 220 and 230 may have various patterns using polygonal shapes such as a rectangle, a triangle, and the like.

The plurality of sensing electrodes 220 and 230 includes a first electrode 220 extending in an X-axis direction and a second electrode 230 extending in a Y-axis direction. The first electrode 220 and the second electrode 230 may be provided on both surfaces of the substrate 210 or provided on different substrates 210 to intersect each other. In the case in which both the first and second electrodes 220 and 230 are provided on one surface of the substrate 210, a predetermined insulating layer may be partially formed at an intersecting point between the first and second electrodes 220 and 230.

A touch sensing apparatus that is electrically connected to the plurality of sensing electrodes 220 and 230 to sense a touch detects capacitive variations sensed in the plurality of sensing electrodes 220 and 230 and senses the touch therefrom. The first electrodes 220 are connected to channels defined as D1 to D8 in the controller integrated circuit to receive predetermined driving signals, and the second electrodes 230 are connected to channels defined as S1 to S8 to be used in order for the controller integrated circuit to detect sensed signals. In this case, the controller integrated circuit may detect mutual-capacitance variations generated between the first and second electrodes 220 and 230 as the sensed signals, and may sequentially apply the driving signals to the individual first electrodes 220 and simultaneously detect capacitance variations in the second electrodes 230.

Figure 3:
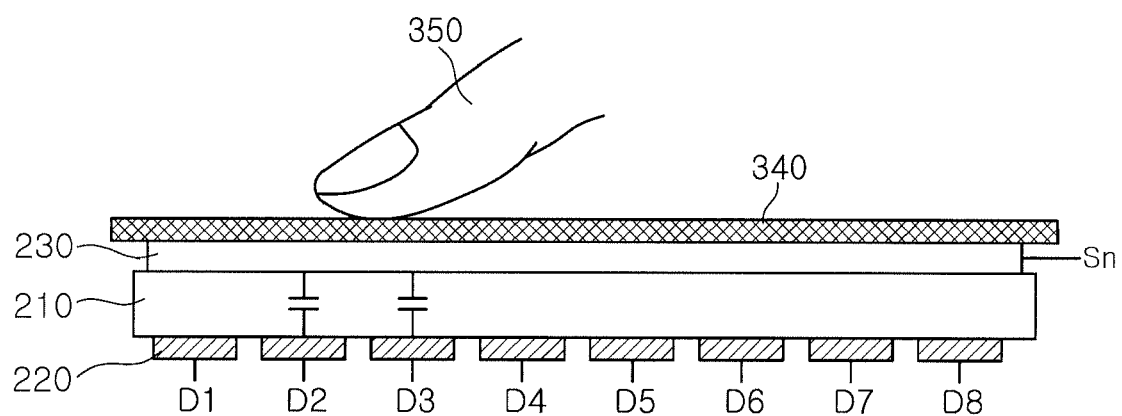
FIG. 3 is a cross-sectional view of the touch sensing panel shown in FIG. 2.

FIG. 3 is a cross-sectional view of the touch sensing panel shown in FIG. 2.

FIG. 3 is a cross-sectional view of the touch sensing panel 200 shown in FIG. 2 taken in a Y-Z direction. The touch sensing panel 200 may further include a cover lens 340 receiving the touch, in addition to the substrate 210 and the plurality of sensing electrodes 220 and 230 described in FIG. 2. The cover lens 340 is provided on the second electrodes 330 used to detect the sensed signals such that it may receive the touch from a touching object 350 such as a finger.

When the driving signals are sequentially applied to the first electrodes 220 through the channels D1 to D8, mutual-capacitance is generated between the first and second electrodes 220 and 230. When the driving signals are sequentially applied to the first electrodes 220, a capacitance variation may occur between the first and second electrodes 220 and 230 adjacent to an area contacted by the touching object 350. The capacitance variation may be proportionate to a dimension of an area overlapped among the touching object 350, the first electrodes 220 applied with the driving signals and the second electrodes 230. In FIG. 3, the mutual-capacitance generated between the first and second electrodes 220 and 230 connected to the channels D2 and D3 is influenced by the touching object 350.

Figure 4:
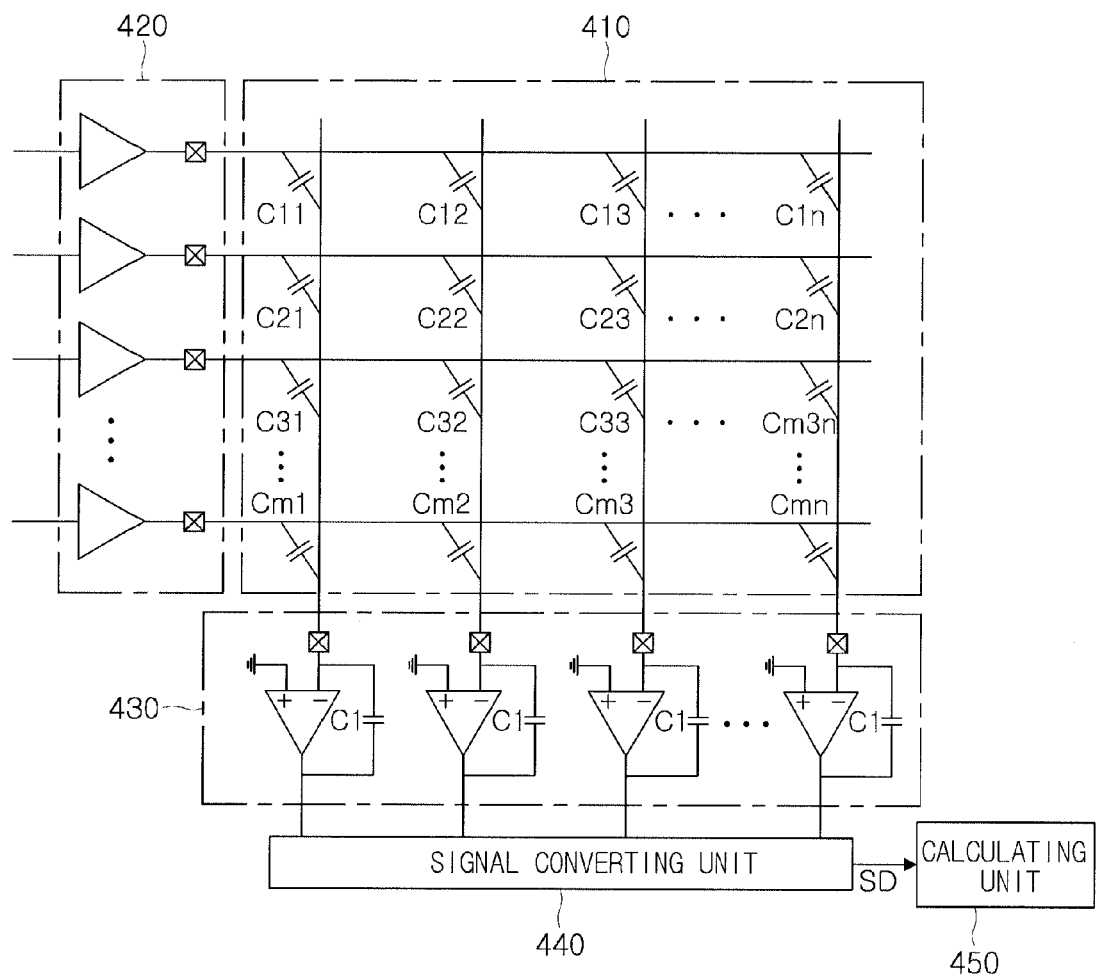
FIG. 4 is a diagram of a touch sensing apparatus according to an embodiment of the present invention.

FIG. 4 is a block diagram of a touch sensing apparatus according to an embodiment of the present invention.

Referring to FIG. 4, a touch sensing apparatus according to the present embodiment includes a panel unit 410, a driving circuit unit 420, a sensing circuit unit 430, a signal converting unit 440, and a calculating unit 450. The panel unit 410 includes a plurality of first electrodes extending in a first axial direction (a horizontal direction of FIG. 4) and a plurality of second electrodes extending in a second axial direction (a vertical direction of FIG. 4) intersecting the first axial direction. Variations in capacitance C11 to Cmn are generated at intersecting points between the first and second electrodes. The variations in capacitance C11 to Cmn generated at the intersecting points of the first and second electrodes may be variations in mutual-capacitance generated by driving signals applied to the first electrodes by the driving circuit unit 420. Meanwhile, the driving circuit unit 420, the sensing circuit unit 430, the signal converting unit 440, and the calculating unit 450 may be configured as an integrated circuit (IC).

The driving circuit unit 420 applies predetermined driving signals the first electrodes of the panel unit 410. The driving signals may have a square wave, a sine wave, a triangle wave, and the like having a predetermined cycle and a predetermined amplitude. The driving signals may be sequentially applied to the plurality of first electrodes, respectively. As shown in FIG. 4, the circuits for generating and applying the driving signals to the first electrodes are individually connected to the plurality of respective first electrodes. However, a single driving signal generating circuit may be used together with a switching circuit such that it may apply the driving signals to the plurality of first electrodes through the switching circuit.

The sensing circuit unit 430 may include integral circuits for sensing the variations in capacitance C11 to Cmn in the second electrodes. The integral circuit may include at least one operational amplifier and a capacitor C1 having a predetermined capacitance. An inversion input terminal of the operational amplifier is connected to the second electrode to convert the variations in capacitance C11 to Cmn to analog signals such as voltage signals and output the signals. When the driving signals are sequentially applied to the plurality of first electrodes, respectively, the variations in capacitance may be simultaneously detected in the plurality of second electrodes, and thus, the number of integral circuits may correspond to the number (m) of the second electrodes.

The signal converting unit 440 generates a digital signal $S_D$ from the analog signal generated by the integral circuit. For example, the signal converting unit 440 may include a time-to-digital converter (TDC) circuit measuring a time required for a voltage type analog signal outputted from the sensing circuit unit 430 to reach a predetermined reference voltage level and converting the measured time into a digital signal $S_D$, or an analog-to-digital converter (ADC) circuit measuring a variation in a level of an analog signal outputted from the sensing circuit unit 430 for a predetermined time and converting the measured variation into a digital signal $S_D$. The calculating unit 450 determines the touch applied to the panel unit 410 by using the digital signal $S_D$. For example, the calculating unit 450 may determine the number of touches applied to the panel unit 410, coordinates of the touch, movements during the touch, and the like.

In general, the panel unit 410 is integrally provided in the upper part of the display apparatus. The panel unit 410 may include first electrodes extending in a first axial direction (horizontal direction) and second electrodes extending in a second axial direction (vertical direction) intersecting the first axial direction. Here, in the case of a variation in capacitance Cm1, both a distance for the application of the driving signal through the driving circuit unit 420 and a distance between the integral circuit of the sensing circuit unit 430 and the variation in capacitance Cm1 are short. Accordingly, distortion of the driving signal due to a resistance component present in the first electrode and distortion of the sensed signal of the variation in capacitance Cm1 due to a resistance component present in the second electrode may be minimized. On the contrary, in the case of a variation in capacitance C1n, since both distortions of the driving signal and the sensed signal are maximized, a method of correcting the distortion of the driving signal applied by the driving signal unit 420 or the distortion of the sensed signal detected by the sensing circuit unit 430 is required.

Figure 5:
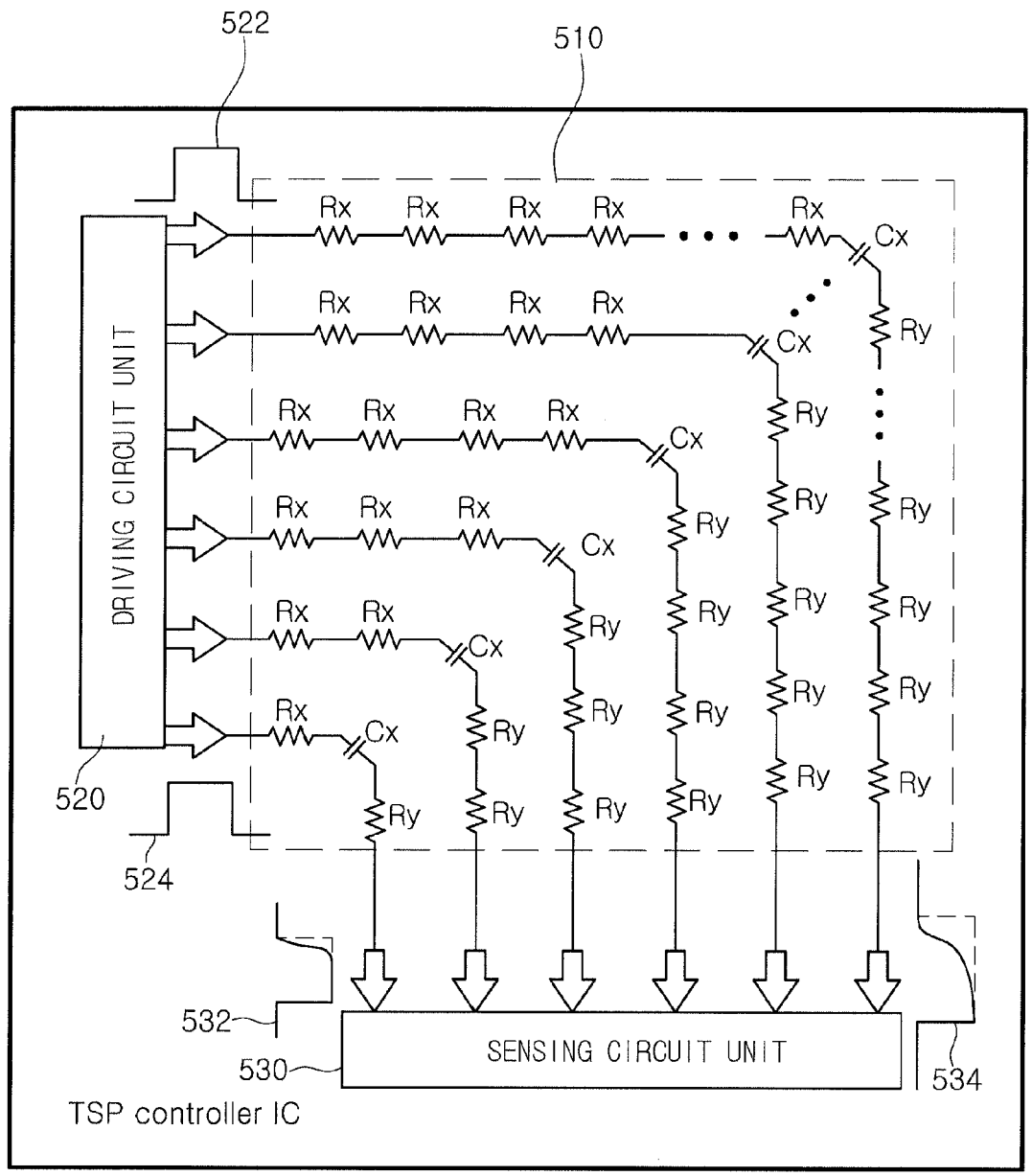
FIG. 5 is a diagram illustrating signal distortion generated in a touch sensing apparatus according to an embodiment of the present invention.

FIG. 5 is a diagram provided to describe signal distortion generated in a touch sensing apparatus according to an embodiment of the present invention.

Referring to FIG. 5, resistance components Rx and Ry are present along sensing electrodes provided in a panel unit 510, and a variation in capacitance Cx is generated in a diagonal direction. FIG. 5 shows variations in capacitance illustrated in order to easily describe the distortion of the driving signal or sensed signal depending on the resistance components Rx and Ry. As shown in FIG. 4, the variations in capacitance may be generated at all the intersecting points of the sensing electrodes.

FIG. 5 shows signal waveforms of a sensing circuit unit 530 measuring variations in capacitance Cx in a first electrode to which a first driving signal 522 is applied through the driving circuit unit 520 and another first electrode to which a second driving signal 524 is applied through the driving circuit unit 520. That is, when a first sensed signal 532 and a second sensed signal 534 are compared with each other, the first sensed signal 532 and the second sensed signal 534 are illustrated to have similar waveforms, but signal distortion may significantly occur in the second sensed signal 534 due to an increase in an RC time constant in the second sensed signal 534 influenced by a relatively larger resistance component. Therefore, even when the same variation in capacitance is generated, in a case in which a reference time in the generation of an analog signal, for example, a voltage signal, by integrating the variation in capacitance or a reference time in the conversion of the analog signal into a digital signal are identically applied to the first and second sensed signals 532 and 534, a difference between the first and second sensed signals 532 and 534 may not accurately be measured.

Therefore, in the embodiment of the present invention, at the time of detecting variations in capacitance generated between the first and second electrodes and determining a touch, parameters required to detect the variations in capacitance and determine the touch are differently set in consideration of the influence of the resistance components depending on the positions of the intersecting points between the first and second electrodes in which the variations in capacitance are detected. For example, as shown in FIG. 5, in consideration of the RC time constant which is changed depending on the resistance components Rx and Ry, an integral time for converting the variation in capacitance into the analog signal in the sensing circuit unit 530 or a reference value for converting the analog signal generated in the sensing circuit unit 530 into the digital signal may be differently applied to each electrode. Alternatively, a time at which the driving circuit unit 520 applies the driving signal to the first electrode may be differently set. Hereinafter, the operation of the touch sensing apparatus will be described in more detail with reference to FIG. 6.

Figure 6A:
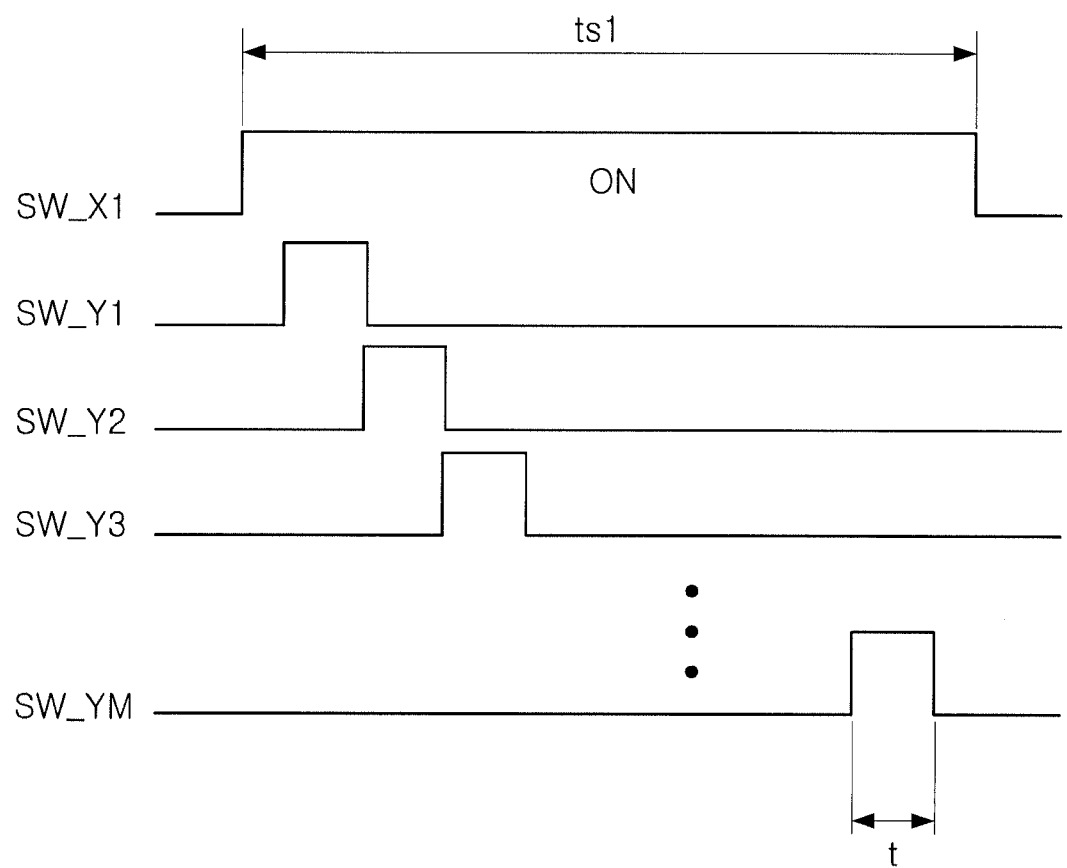
FIGS. 6A and 6B are waveform diagrams illustrating an operation of a touch sensing apparatus according to an embodiment of the present invention.
Figure 6B:
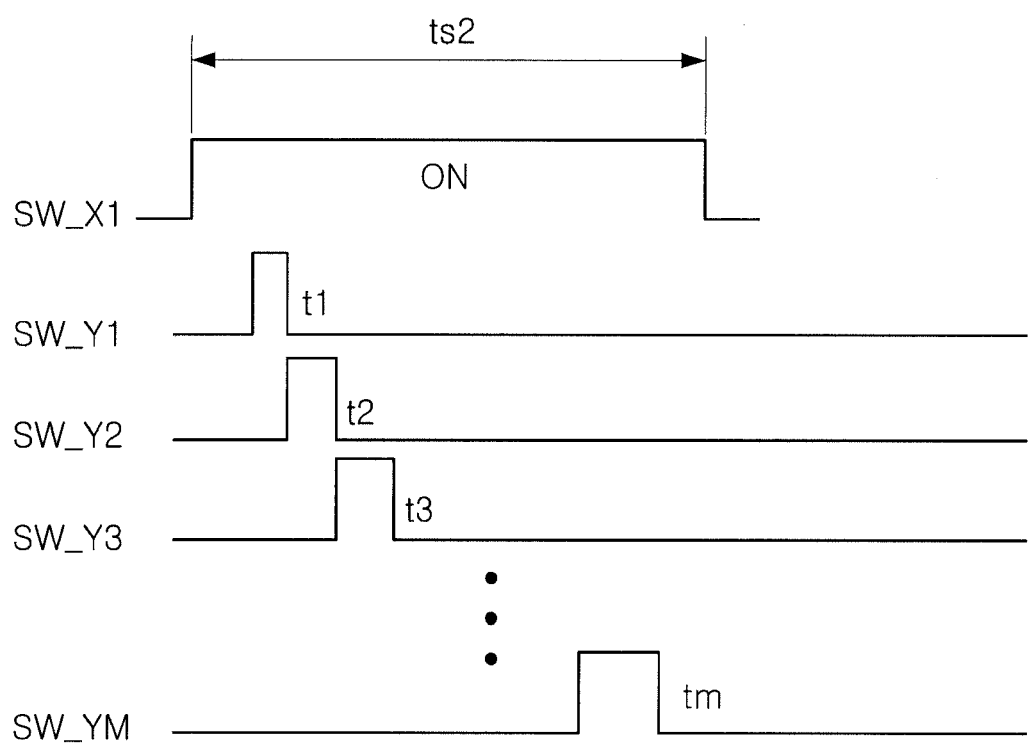

FIGS. 6A and 6B are waveform diagrams provided to describe the operation of the touch sensing apparatus according to the embodiment of the present invention. Hereinafter, in FIGS. 6A and 6B, it is assumed that one integrator is included in the sensing circuit unit, but the invention is not limited thereto.

FIG. 6A is a waveform diagram illustrating an operation of determining a touch in a general touch sensing apparatus. Referring to FIG. 6A, for a time ts1 during which a driving signal is applied to a first electrode x1, second electrodes Y1 to YM are sequentially connected to the sensing circuit unit 430 by a switching operation. Times t during which the individual second electrodes Y1 to YM are connected to the sensing circuit unit 430 are identical to each other and consequently, ts1 may be set to a time having a predetermined margin given to t*M for a stable operation.

Assumed that the second electrodes Y1 to YM are sequentially arranged from left to right in a horizontal axis direction in the panel unit 410 of the touch sensing apparatus, the resistance components Rx and Ry are relatively large in the second electrode YM than in the second electrode Y1, and as a result, the RC time constant increases to thereby cause an increase in signal distortion. Therefore, in FIG. 6A, times t for detecting the variations in capacitance in the second electrodes Y1 to YM should be set to allow for the stable detection of the variation in capacitance in the second electrode YM corresponding to the worst case. However, in this case, the other second electrodes Y1 to Y(M−1) are unnecessarily connected to the sensing circuit unit 430 for a long time to deteriorate operational efficiency.

FIG. 6B is a waveform diagram illustrating an operation of determining a touch in the touch sensing apparatus according to the embodiment of the present invention. Referring to FIG. 6B, for a time ts2 during which the driving signal is applied to the first electrode X1, the second electrodes Y1 to YM are sequentially connected tp the sensing circuit unit 430 by the switching operation. However, unlike FIG. 6A, times during which the individual second electrodes Y1 to YM are connected to the sensing circuit unit 430 are differently set to t1 to tm, and in particular, t1 is the shortest time duration and the time durations gradually increase toward tm.

As described above, the resistance components Rx and Ry are relatively large in the second electrode YM, and the RC time constant also increases, and as a result, the signal distortion is increased and a time required to detect the same variation in capacitance is longer in the second electrode YM than in the second electrode Y1. Therefore, the times during which the second electrodes Y1 to YM are connected to the sensing circuit unit 430 are differently set in consideration of RC time constants of the individual second electrodes, and as a result, the time ts2 during which the driving signal is applied to the first electrode X1 may be shorter than ts1 corresponding to the case of FIG. 6A. Therefore, this lead to an improvement in terms of power consumption and response speed.

Figure 7:
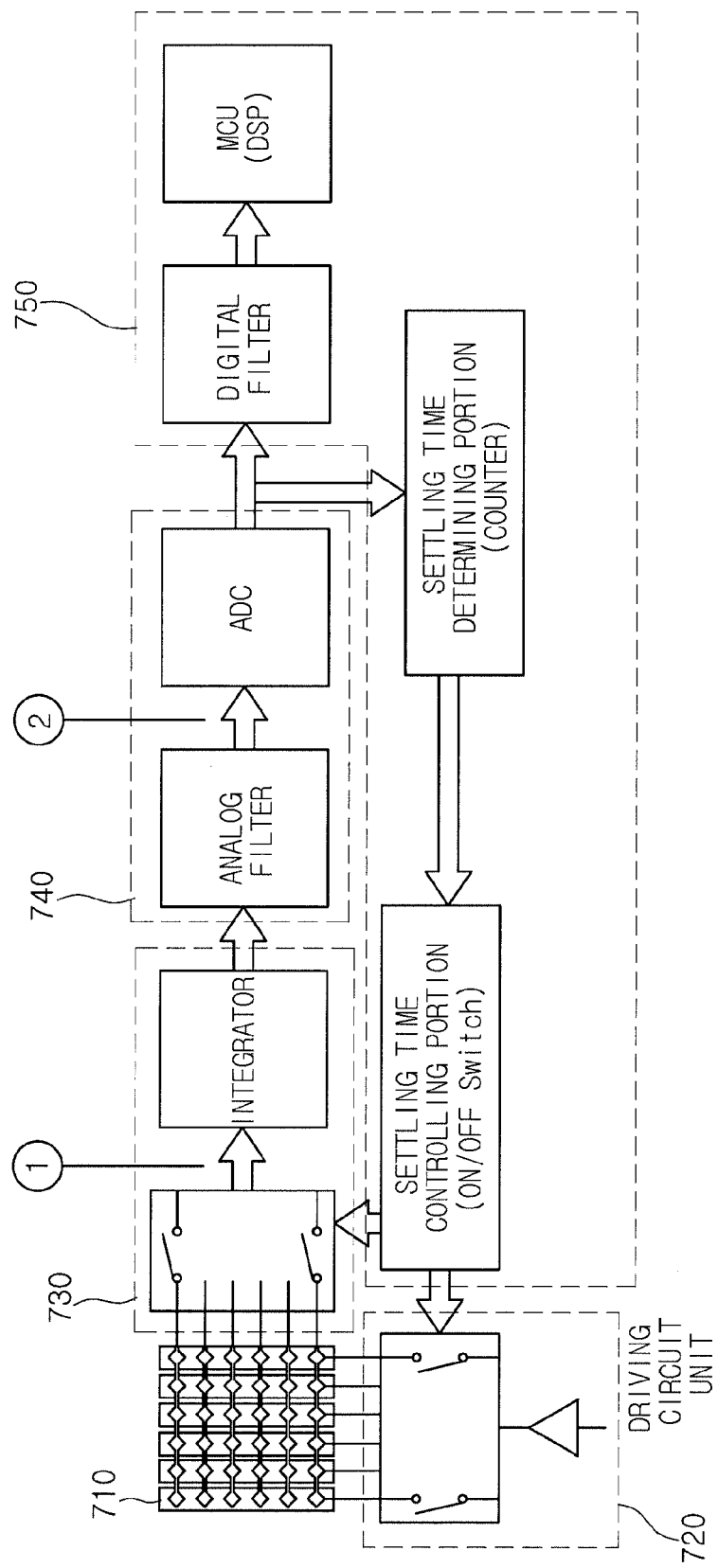
FIG. 7 is a block diagram illustrating an operational method of a touch sensing apparatus according to an embodiment of the present invention.

FIG. 7 is a block diagram provided to describe an operational method of a touch sensing apparatus according to an embodiment of the present invention.

Referring to FIG. 7, a touch sensing apparatus according to the present embodiment includes a panel unit 710, a driving circuit unit 720, a sensing circuit unit 730, a signal converting unit 740, and a calculating unit 750. In FIG. 7, each of the driving circuit unit 720 and the sensing circuit unit 730 includes a switching circuit, and it is assumed that the application of a driving signal and the generation of an analog signal are performed by a single driving portion and a single integrator. Of course, the touch sensing apparatus may be differently configured in another embodiment.

First and second electrodes having predetermined shapes are arranged to intersect each other in the panel unit 710. In FIG. 7, the first electrodes have a rectangular shape and the second electrodes have a diamond pattern, but the shapes of the first and second electrodes are not limited thereto.

The driving circuit unit 720 includes the driving portion and the switching circuit. The switching circuit sequentially transfers the driving signal output from the driving portion to the plurality of individual first electrodes. A mutual-capacitance is generated between a first electrode receiving the driving signal and a corresponding second electrode intersecting the first electrode receiving the driving signal. When a touch is applied through a cover lens separately provided on the panel unit 710, a variation in mutual-capacitance is generated in the second electrode which is overlapped with the touch or positioned adjacent to the touch and the sensing circuit unit 730 detects the variation in mutual-capacitance.

The sensing circuit unit 730 includes the switching circuit and the integrator. The integrator is connected to the plurality of individual second electrodes through the switching circuit to generate an analog signal, for example, a voltage signal from the variation in capacitance. The analog signal generated by the integrator is input into the signal converting unit 740 and subjected to predetermined pre-processing by an analog filter and thereafter, converted into a digital signal in an analog-to-digital converter (ADC) circuit. In FIG. 7, the ADC circuit is included in the signal converting unit 740, but the ADC circuit may be substituted by a time-to-digital converter (TDC) circuit.

The digital signal generated by the signal converting unit 740 is transferred to the calculating unit 750. A digital filter of the calculating unit 750 filters the digital signal generated by the signal converting unit 740 to remove noise or control a signal level and determines the touch through digital signal processing (DSP) in an MCU. The calculating unit 750 may determine the number of touches, the coordinates of the touch, movements during the touch, and the like. Meanwhile, the digital signal output from the signal converting unit 740 is input into a settling time determining portion of the calculating unit 750 to be used in setting parameters for capacitance detection applied to the plurality of individual first and second electrodes.

For example, the settling time determining portion may differently set the capacitance detection parameters for the respective first and second electrodes by using a clock signal having a predetermined frequency. As described above, when a time required to stabilize the variation in capacitance detected by the sensing circuit unit 740, i.e., a time corresponding to the RC time constant, is long due to a large influence caused by the resistance components, the settling time determining portion may determine a time during which the integrator is connected to the corresponding second electrode to be relatively long. On the contrary, when the influence by the resistance components is small, the settling time determining portion may determine the time during which the integrator is connected to the corresponding second electrode to be relatively short.

A settling time controlling portion controls the operations of the switching circuits included in the driving circuit unit 720 and the sensing circuit unit 730 according to the parameters determined with respect to the individual first and second electrodes in the settling time determining portion. The operation of the switching circuit included in the sensing circuit unit 730 may be controlled to extend the time during which the integrator is connected to the second electrode requiring a relatively long settling time. Further, with regard to the first electrode receiving the driving signal, times during which the driving portion and the individual first electrodes are connected may be actively controlled in the switching circuit of the driving circuit unit 720, in consideration of the influence of the resistance components.

Figure 8:
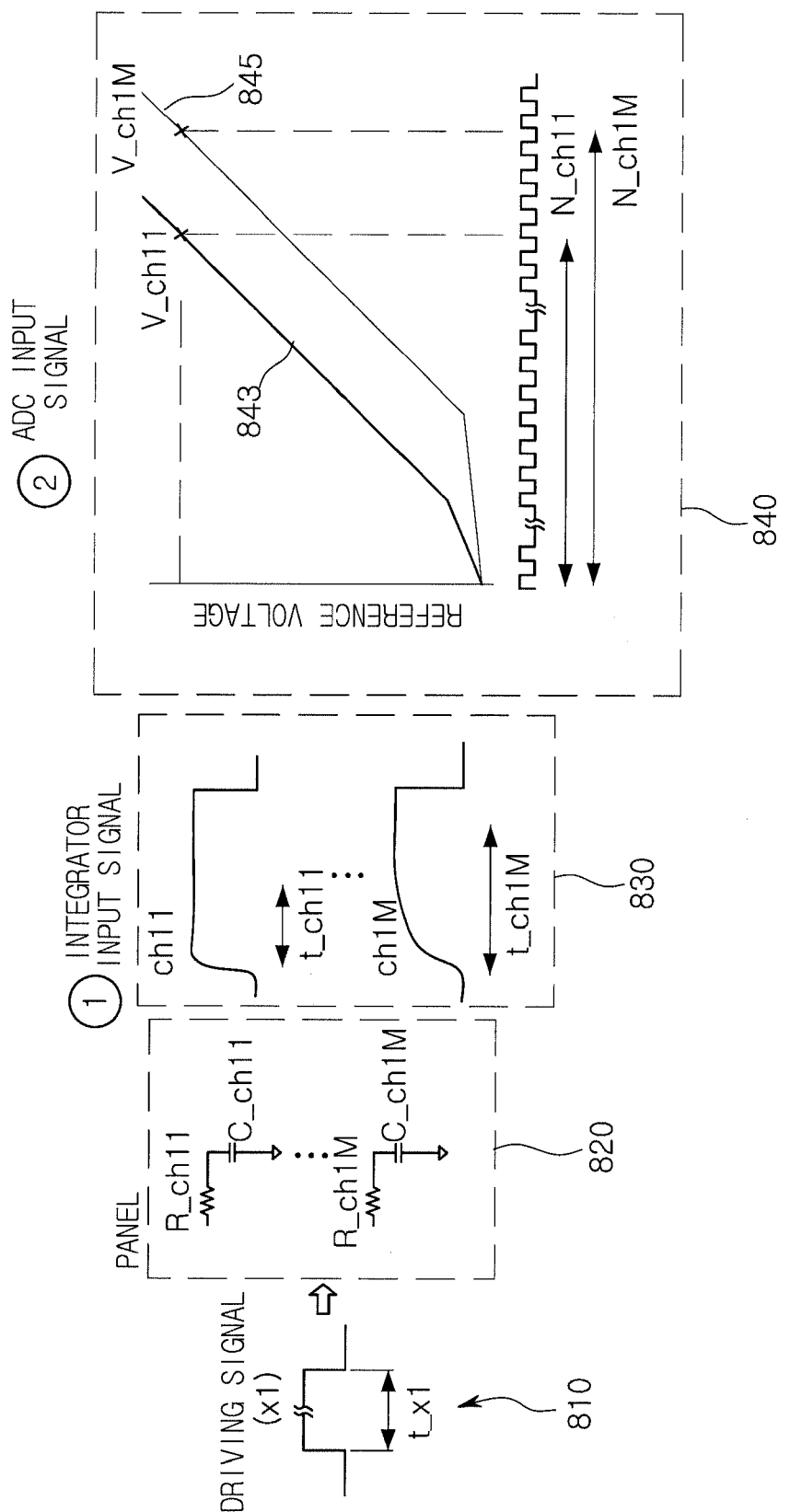
FIG. 8 is a diagram illustrating a touch sensing method according to an embodiment of the present invention.

FIG. 8 is a diagram provided to describe a touch sensing method according to an embodiment of the present invention.

Referring to FIG. 8, a driving signal is applied to a predetermined first electrode x1. The driving signal is applied to the first electrode x1 for a time t_x1 (810). For the time t_x1 during which the driving signal is applied to the first electrode x1, other first electrodes x2 to xn may be connected to predetermined constant voltage, preferably, ground-level constant voltage, and the sensing circuit unit 730 detects variations in capacitance in second electrodes y1 to yM intersecting the first electrode x1.

Operational conditions in the panel unit 710 are differently set as described above. That is, when the driving signal is applied to the first electrode x1 among the plurality of first electrodes, resistance components are differently determined as values of R_ch11 to R_ch1M depending on a position of an electrode among a plurality of, second electrodes in which the variation in capacitance is detected (820). Therefore, with regard to a signal input into the integrator of the sensing circuit unit 730, the settling times t_ch11 to t_ch1M required to stabilize the signal are different from each other for the individual second electrodes as shown in FIG. 8. Since the resistance component R_ch1M has the largest value, the settling time t_ch1M corresponding thereto is longest.

The signal input into the analog-to-digital converter of the signal converting unit 740 is determined according to a settling time of the analog signal (840). When the driving signal is applied to the first electrode x1 and the variation in capacitance is detected in the second electrode y1 (843), the settling time t_ch11 is relatively short, and when the variation in capacitance is detected in the second electrode yM (845), the settling time t_ch1M is relatively long. Accordingly, when a time required to reach a reference voltage is calculated by counting the number of on-off times of a clock signal having a predetermined frequency, the time is differently counted as N_ch11 in the case of the second electrode y1 (843) and as N_ch1M in the case of the second electrode yM, as shown in FIG. 8. Since the counting numbers N_ch11 to N_ch1M of the clock signal are substantially proportional to the settling times, N_ch11 has the smallest value and N_ch1M has the largest value.

In the above-mentioned embodiments, the integration time or digital signal generation time is set differently for each electrode in the sensing circuit unit 730 or the signal converting unit 740, but time for the application of the driving signal may also be considered, together with the integration time or digital signal generation time. A first electrode which is relatively further from the sensing circuit unit 730 has a relatively larger resistance component than other first electrodes, and as a result, the RC time constant increases to thereby cause an increase in the settling time. Accordingly, the driving signal is applied to a first electrode which is positioned relatively further from the sensing circuit unit 730 for a relatively longer time, while the driving signal is applied to a first electrode which is positioned relatively closer to the sensing circuit unit 730 for a relatively shorter time, whereby improvements in terms of response speed and power consumption may be achieved.

As set forth above, a touch sensing apparatus and a method thereof according to embodiments of the present invention that can accurately determine a touch by differently setting a reference value for converting an analog signal generated from a variation in capacitance into a digital signal depending on the position of an sensing channel or an electrode in which the variation in capacitance is detected. In addition, a response speed can be improved and power consumption can be reduced, whereby overall performance can be improved.

While the present invention has been shown and described in connection with the embodiments, it will be apparent to those skilled in the art that modifications and variations can be made without departing from the spirit and scope of the invention as defined by the appended claims.

What is claimed is:

1. A touch sensing apparatus, comprising:
 a panel unit provided with a plurality of electrodes including a plurality of first electrodes extending in a first axial direction and a plurality of second electrodes extending in a second axial direction intersecting the first electrodes extending in the first axial direction;
 a driving circuit unit to apply a predetermined driving signal to the plurality of first electrodes;

a sensing circuit unit to detect variations in capacitance in the second electrodes intersecting the first electrodes to which the driving signal is applied; and a calculating unit to determine whether a touch interaction has occurred based on the detected variations in capacitance, the calculating unit applying different parameters to individual electrodes of the plurality of electrodes to determine whether the touch interaction has occurred on the individual electrodes of the plurality of electrodes, and the calculating unit setting the different parameters, which are applied to the individual electrodes of the plurality of electrodes, according to positions of the first electrodes to which the driving signal is applied and positions of the second electrodes in which the variations in capacitance are detected.

2. A touch sensing apparatus, comprising:

a panel unit provided with a plurality of electrodes including a plurality of first electrodes extending in a first axial direction and a plurality of second electrodes extending in a second axial direction intersecting the first electrodes extending in the first axial direction;

a driving circuit unit to apply a predetermined driving signal to the plurality of first electrodes;

a sensing circuit unit to detect variations in capacitance in the second electrodes intersecting the first electrodes to which the driving signal is applied; and a calculating unit to determined whether a touch interaction has occurred based on the detected variations in capacitance, the calculating unit applying different parameters to individual electrodes of the plurality of electrodes to determine whether the touch interaction has occurred on the individual electrodes of the plurality of electrodes, the different parameters, which are applied to the individual electrodes of the plurality of electrodes, are set according to positions of the individual electrodes of the plurality of electrodes in which the variations in capacitance are detected, and the different parameters include times during which the driving circuit unit applies the driving signal to the plurality of individual first electrodes.

3. A touch sensing apparatus comprising:

a panel unit provided with a plurality of electrodes;

a sensing circuit unit to detect variations in capacitance in the plurality of electrodes; and a calculating unit to determine whether a touch interaction has occurred based on the detected variations in capacitance, the calculating unit applying different parameters to individual electrodes of the plurality of electrodes to determine whether the touch interaction has occurred on the individual electrodes of the plurality of the electrodes, the different parameters, which are applied to the individual electrodes of the plurality of electrodes, are set according to positions of the individual electrodes of the plurality of electrodes in which the variations in capacitance are detected, and the different parameters include at least one of a first time required for the sensing circuit unit to generate a voltage signal from the variations in capacitance and a second time required for the voltage signal to reach a predetermined level.

4. A touch sensing method, comprising:

applying a driving signal to a plurality of first electrodes;

detecting variations in capacitance in a plurality of second electrodes intersecting the plurality of first electrodes to which the driving signal is applied; and determining a touch from the variations in capacitance, the determining of the touch including setting different parameters for detecting the variations in capacitance, according to positions of individual electrodes of the plurality of first electrodes to which the driving signal is applied and positions of individual electrodes of the plurality of second electrodes in which the variations in capacitance are detected.

5. The touch sensing method of claim 4, wherein the detecting of the variations in capacitance comprises detecting variations in mutual-capacitance generated between the plurality of first electrodes to which the driving signal is applied and the plurality of second electrodes.

6. The touch sensing method of claim 4, wherein the determining of the touch comprises setting the different parameters according to at least one of the positions of the plurality of first electrodes to which the driving signal is applied and the positions of the plurality of second electrodes in which the variations in capacitance are detected.

7. The touch sensing method of claim 4, wherein the parameters include a first time required for generating a voltage signal from the variations in capacitance, a second time required for the voltage signal to reach a predetermined level, and a third time during which the driving signal is applied to the plurality of first electrodes.

8. The touch sensing method of claim 4, wherein the determining of the touch includes:

generating a digital signal from an analog signal depending on the variations in capacitance; and determining the touch from the digital signals.

9. The touch sensing method of claim 8, wherein the generating of the digital signal comprises generating the digital signal by measuring times required for the analog signal to reach a predetermined level.

10. The touch sensing method of claim 9, wherein the generating of the digital signal comprises setting the predetermined level differently, according to the positions of individual electrodes of the plurality of first electrodes to which the driving signal is applied and the positions of individual electrodes of the plurality of second electrodes in which the variations in capacitance are detected.

11. The touch sensing method of claim 8, wherein the generating of the digital signals comprises generating the digital signal by measuring variations in a level of the analog signal for a predetermined time.

12. The touch sensing method of claim 11, wherein the generating of the digital signals comprises setting the predetermined time differently, according to the positions of the plurality of first electrodes to which the driving signal is applied and the positions of the plurality of second electrodes in which the variations in capacitance are detected.

* * * * *